US005664448A

United States Patent [19]

Swan et al.

[11] Patent Number: 5,664,448

[45] Date of Patent: Sep. 9, 1997

[54] LOCKING DOOR HANDLE

[75] Inventors: David A. Swan, Shoreview; Robert G. Lau, Anoka, both of Minn.

[73] Assignee: Federal-Hoffman, Inc., Anoka, Minn.

[21] Appl. No.: 650,215

[22] Filed: May 20, 1996

Related U.S. Application Data

[63] Continuation of Ser. No. 189,729, Feb. 1, 1994, abandoned.

[51] Int. Cl.$^6$ .................. G05G 5/00; F16C 3/00

[52] U.S. Cl. .................. 70/224; 70/203; 70/212; 70/467; 70/367; 70/DIG. 31; 70/DIG. 63

[58] Field of Search .................. 70/224, 201, 203, 70/215, 212, 216, 490, 367, 379 R, 379 A, DIG. 31, DIG. 36, DIG. 63, 467, 478, 202

[56] References Cited

U.S. PATENT DOCUMENTS

| | | | |
|---|---|---|---|
| 980,467 | 1/1911 | Witham | 70/203 |
| 1,236,914 | 8/1917 | Coté | 70/185 |
| 1,559,189 | 10/1925 | Shaw | 70/201 |
| 1,724,025 | 8/1929 | Jacobi | 70/380 |
| 1,789,756 | 1/1931 | Jacobi | 70/380 |
| 1,909,393 | 5/1933 | Diesel | 70/216 |
| 2,036,764 | 4/1936 | Lowe | 70/379 R |
| 2,316,956 | 4/1943 | Heath | 70/186 |
| 2,726,889 | 12/1955 | Lawson | 292/DIG. 37 |
| 3,508,423 | 4/1970 | Jackes et al. . | |
| 3,808,850 | 5/1974 | Walters | 70/215 |
| 3,889,498 | 6/1975 | Harrell | 70/78 |
| 4,036,039 | 7/1977 | Nakanishi | 70/90 |
| 4,205,867 | 6/1980 | Loikitz | 70/150 |

FOREIGN PATENT DOCUMENTS

| | | | |
|---|---|---|---|
| 759232 | 1/1934 | France . | |
| 1147327 | 11/1957 | France . | |
| 1554905 | 1/1969 | France . | |
| 2441704 | 6/1980 | France . | |
| 643435 | 4/1937 | Germany | 70/216 |
| 88 04 160.3 | 7/1988 | Germany . | |

*Primary Examiner*—Darnell M. Boucher

*Attorney, Agent, or Firm*—Merchant, Gould, Smith, Edell, Welter & Schmidt

[57] ABSTRACT

A locking handle for an access door includes a housing with a cam rotatably mounted within the housing. The cam is connected to a locking pin for the pin to move transversely in response to rotational movement of the cam. A locking bar is slidably received on the housing and moved to a locked position to prevent rotation of the cam.

11 Claims, 8 Drawing Sheets

LOCKING DOOR HANDLE

CROSS REFERENCES TO RELATED APPLICATIONS

This application is a continuation of U.S. patent application Ser. No. 08/189,729, filed Feb. 1, 1994, now abandoned.

I. BACKGROUND OF THE INVENTION

1. Field of the Invention

This invention pertains to door handles for operating latched doors. More particularly, this invention pertains to such a door handle which may be locked to prevent a door from being opened.

2. Description of the Prior Art

Electronics and other valuable artifacts are frequently stored in cabinets having front facing doors permitting access to the interior of the cabinet. Where valuable or confidential information is stored within a cabinet, it is desirable to provide a means for locking the cabinet door to prevent unauthorized access.

The prior art contains door knobs or door handles which may be locked to prevent access. For example, well known door knobs contain key cylinders within the knob preventing rotation of the knob absent insertion and operation of a key.

For cabinets used in industrial applications for storing electronic equipment or the like, sturdy and cost effective door handles are required. Such products must be of durable construction to withstand repeated and abusive use in an industrial setting. Further, such products must be susceptible to inexpensive manufacture. It is an object of the present invention to provide a locking door handle for an access door which provides an effective lock, is sturdy in construction and is susceptible to low cost manufacture.

II. SUMMARY OF THE INVENTION

According to a preferred embodiment of the present invention, a locking door handle is provided for an access door. The door handle includes a housing having an axial dimension. A locking pin is mounted within the housing. The locking pin is movable transverse to the axial dimension between a locked position and an unlocked position. When in the locked position, the locking pin has an end which protrudes beyond the exterior the housing. In the unlocked position, the end of the pin is retracted toward the housing. The locking handle further includes an operator engageable cam secured to the housing. Movement of the cam in a first direction causes the pin to be urged to its unlocked position. Movement of the cam to a second position causes the pin to be moved to the locked position. The cam is biased to its second position. The locking handle further includes a locking bar which when moved to a first position locks the cam in its second position. The locking bar is biased away from its first position. The locking bar is susceptible to being fixed in its first position thereby locking the handle.

III. BRIEF DESCRIPTION OF THE DRAWINGS

IV. DESCRIPTION OF THE PREFERRED EMBODIMENT

Figure 1:
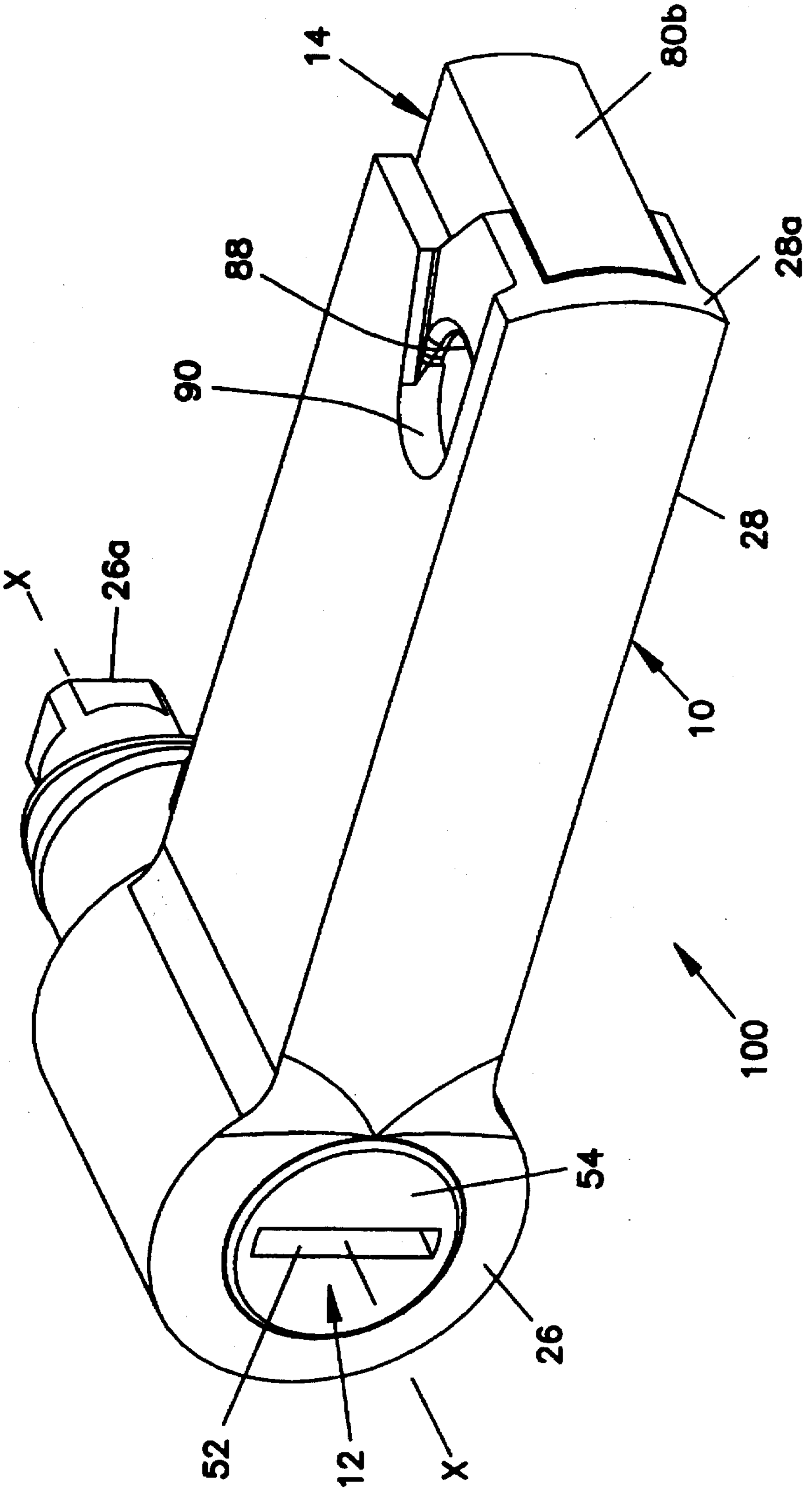
FIG. 1 is a perspective view of a locking handle according to the present invention.
Figure 2:
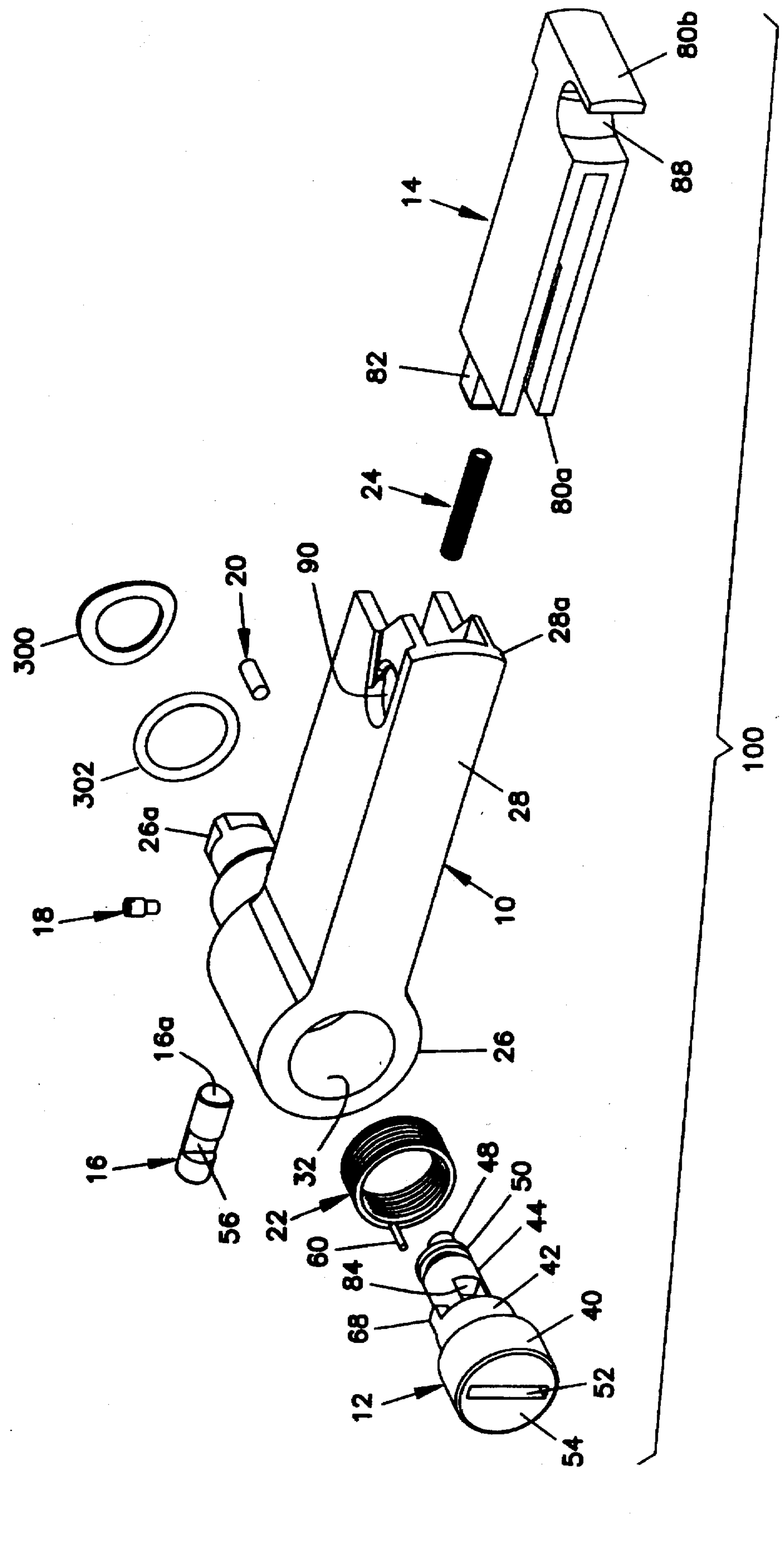
FIG. 2 is an exploded perspective view of a locking handle of FIG. 1.

With reference now to the several drawing figures in which identical elements are numbered identically throughout, a description of the preferred embodiment of the present invention will now be provided. With initial reference to FIG. 2, the individual elements of the locking handle 100 include a housing 10, a cam 12, a locking bar 14, a locking pin 16, a set screw 18, a retaining pin 20, a torsion spring 22, and a compression spring 24. Each of these elements will be separately discussed. To seal the handle 100 to a door, a washer 300 and 0-ring 302 are provided.

The housing 10 (shown separately in FIGS. 4 through 9) includes a barrel portion 26 and a handle portion 28. The barrel portion 26 is generally cylindrical having a cylindrical axis X-X. The handle portion 28 extends radially from the barrel portion 26.

An axial end *26a* of the barrel portion 26 is provided with an attachment means 30 (e.g., a female threaded bore) for attaching the housing 10 to a latch mechanism of a door. It will be appreciated that attachment means 30, door latch mechanisms and the like are well known and operate such that upon rotation of the handle 10 about the axial dimension X-X, the latching mechanism moves from a locked position to an unlocked position to permit the door to be swung open within its frame.

The barrel portion 26 is provided with an internal chamber 32 extending axially within the barrel portion 26. The chamber 32 is sized to receive the cam 12 with the internal surfaces of the chamber 32 and external surfaces of the cam 12 complimentarily sized and shaped for the cam 12 to be rotatable about its axis X-X when placed within the chamber 32.

The cam 12 (shown separately in FIGS. 10 through 14) has an operator engageable cylindrical end 40 which is generally the same diameter as chamber 32. Extending axially from end 40 is a reduced diameter central portion 42. Extending axially from central portion 42 is a still further reduced diameter distal end 44.

The distal end 44 terminates at an axial face 46. Extending from axial face 46 is a cam shaft 48 which is provided in the form of a cylindrical pin having its cylindrical axis Y-Y being parallel to but offset from the axis X-X of cam 12. An annular groove 50 is formed in distal end 44 adjacent its axial end 46.

Figure 8:
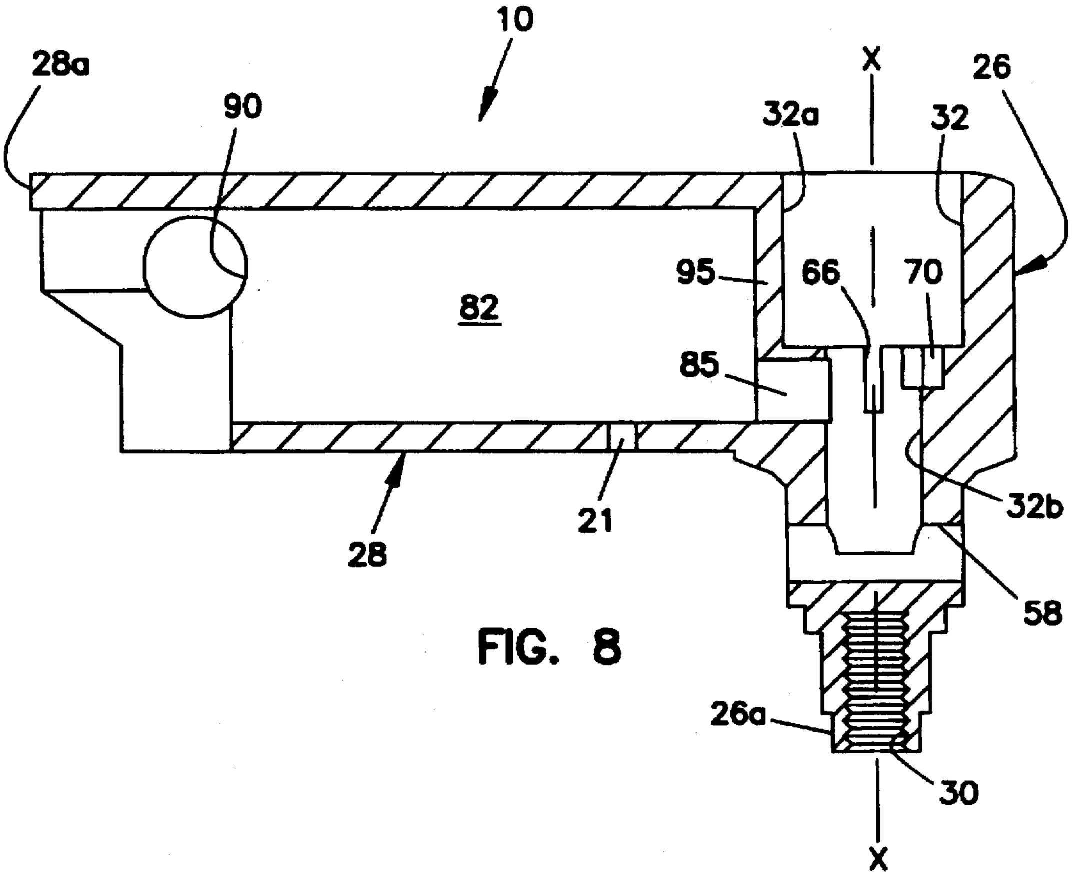
FIG. 8 is a view taken along line 8—8 of FIG. 7.
Figure 9:
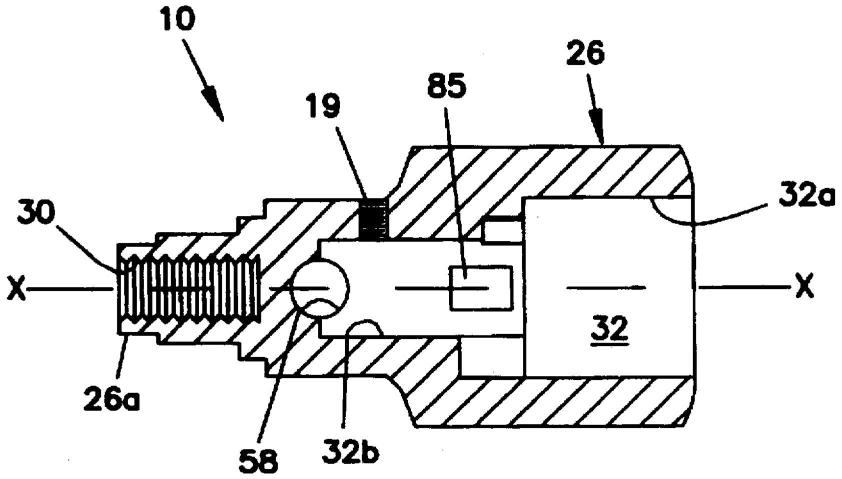
FIG. 9 is a view taken along line 9—9 of FIG. 7.
Figure 14:
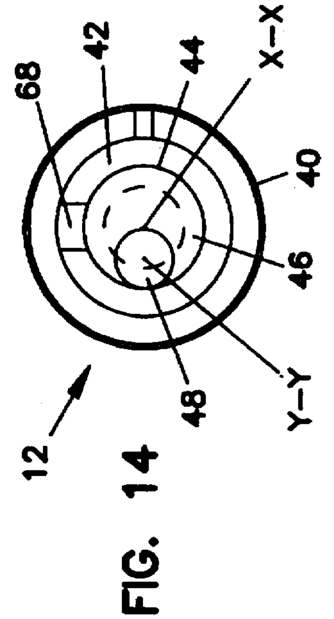
FIG. 14 is a rear elevation view of the cam of FIG. 10 shown on a side opposite of that shown in FIG. 10.
Figure 13:
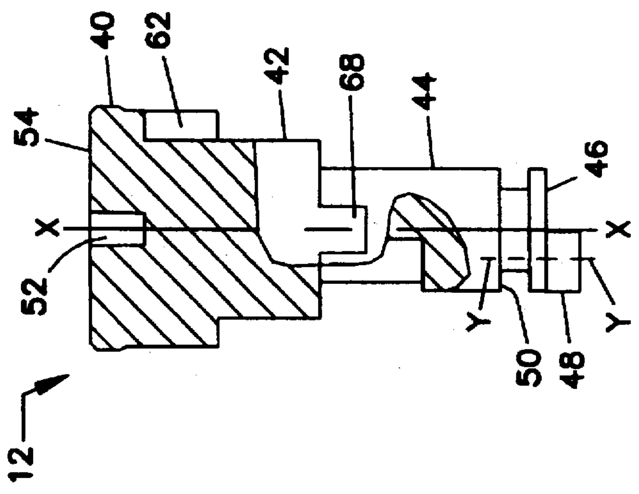
FIG. 13 is a view of a cam of FIG. 11 shown rotated 90 degrees from the view of FIG. 11 and shown partially in section.
Figure 12:
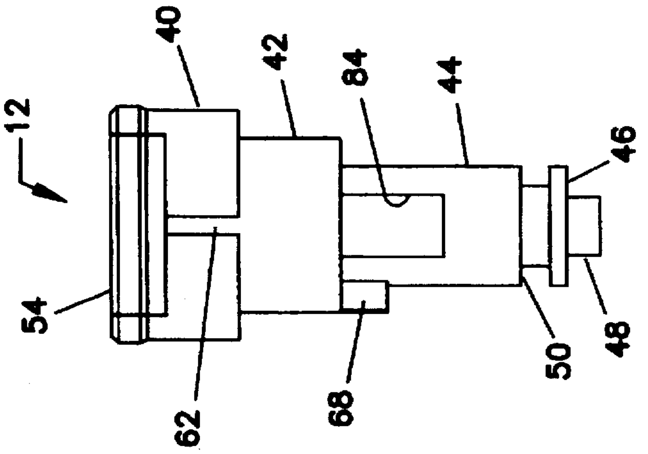
FIG. 12 is a side elevation view of the cam of FIG. 10 shown on a side opposite of that of FIG. 11.
Figure 10:
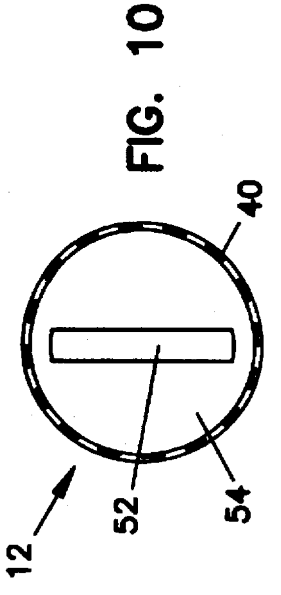
FIG. 10 is a front elevation view of an exposed axial end of a cam for use in the present invention.
Figure 11:
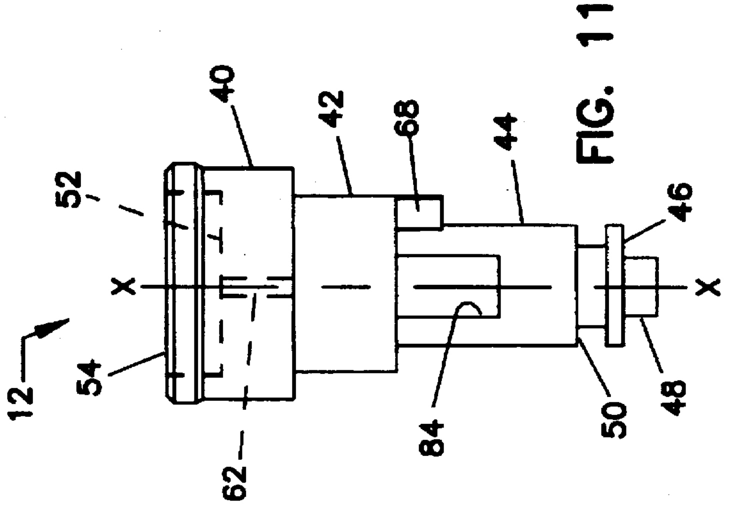
FIG. 11 is a side elevation view of the cam of FIG. 10.
Figure 17:
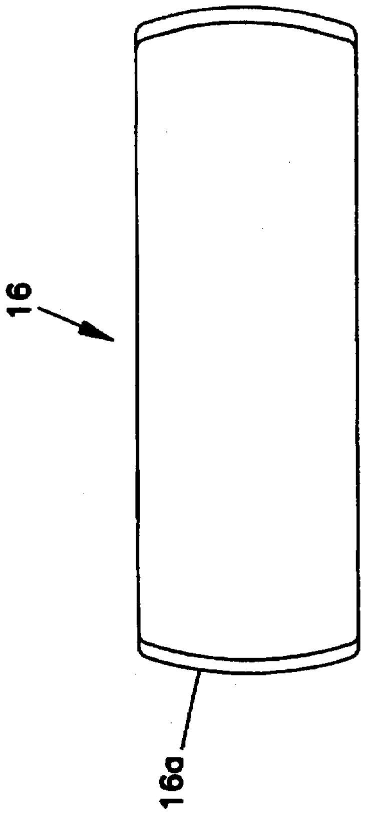
FIG. 17 is a side elevation view of the pin of FIG. 15.
Figure 18:
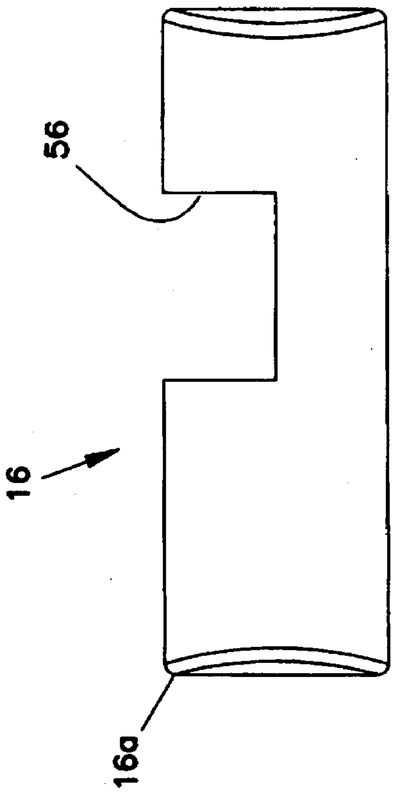
FIG. 18 is the view of FIG. 17 shown rotated 90 degrees.
Figure 15:
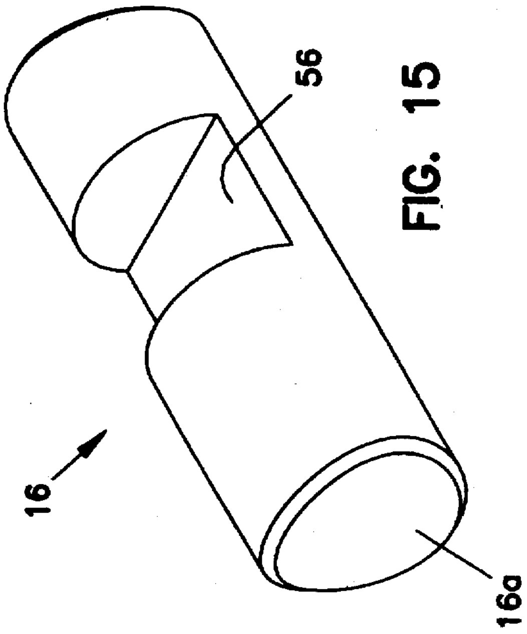
FIG. 15 is a perspective view of a locking pin for use in the present invention.
Figure 16:
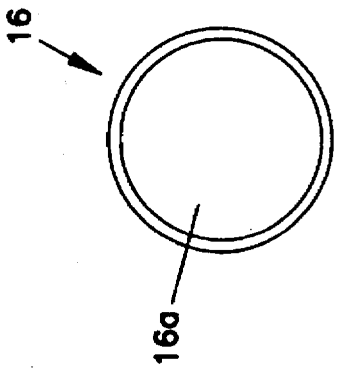
FIG. 16 is a view of an axial end of the pin of FIG. 15.
Figure 21:
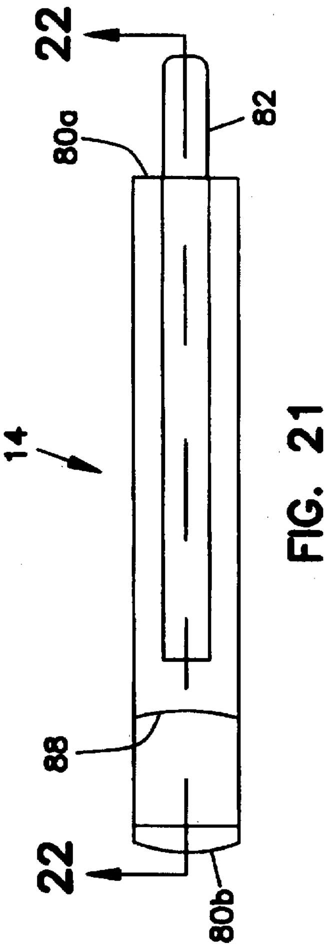
FIG. 21 is a top elevation view of the locking bar of FIG. 19.
Figure 22:
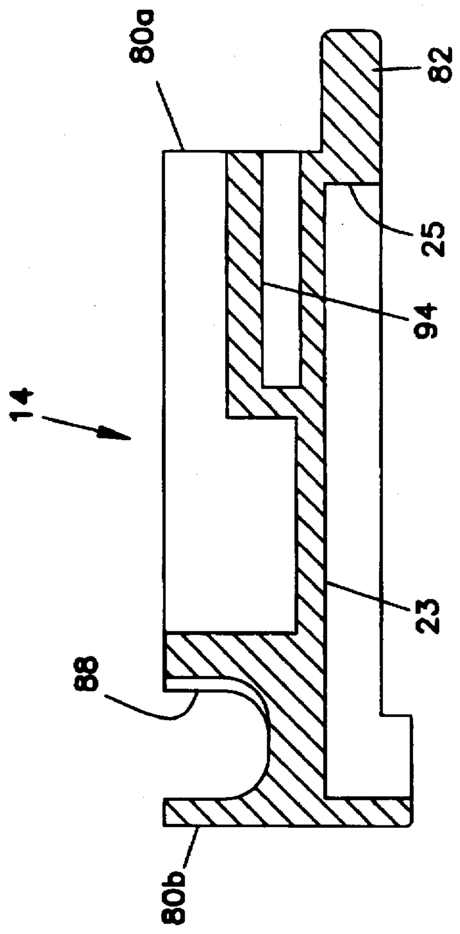
FIG. 22 is a view taken along line 22—22 of FIG. 21.
Figure 19:
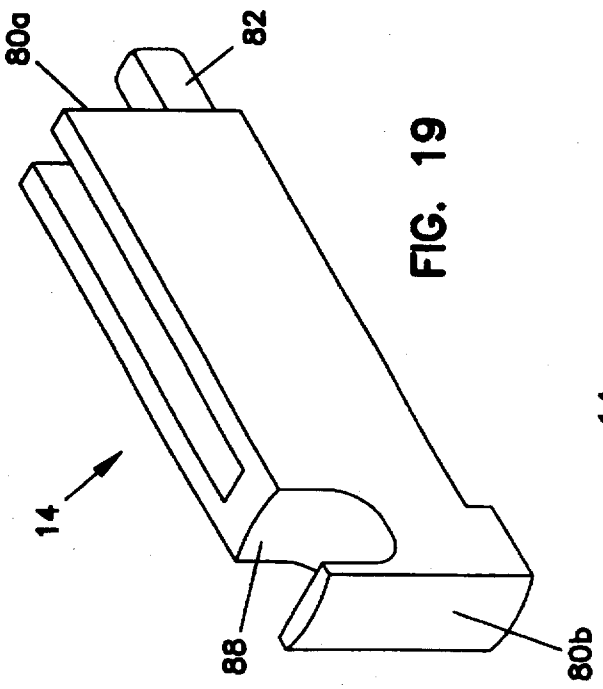
FIG. 19 is a perspective view of a locking bar for use in the present invention.
Figure 20:
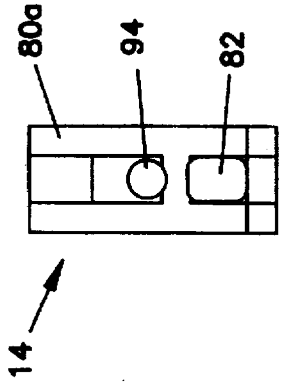
FIG. 20 is a view of an interior end of the locking bar of FIG. 19.

Shown best in FIGS. 8 and 9, the chamber 32 includes a large diameter end 32*a* adjacent the exterior of barrel portion 26 and a reduced diameter portion 32*b*. The reduced diameter portion 32*b* has a diameter approximate to the diameter of the distal end 44. Similarly, the diameter of portion 32*a* of chamber 32 is approximate to the diameter of cylindrical end 40 of cam 12.

A groove 52 is formed in the axial face 54 of the cylindrical end 40 of cam 12. With the cam 12 mounted within chamber 32, axial face 54 and groove 52 are exposed to an operator.

Locking pin 16 (shown separately in FIGS. 15 through 18) is generally cylindrical. A slot 56 is formed through a side of the pin 16.

The housing barrel portion 26 includes a transverse bore 58 which extends through the barrel portion 26 at the terminal end of chamber 32 (see FIG. 9). The bore 58 extends generally transverse to the axis X-X of the cam 12.

The pin 16 and the bore 58 are mutually sized for the pin 16 to be slidably received within the bore 58. Therefore, pin 16 may slide in a direction parallel to its cylindrical axis and transverse to the axis X-X of the cam 12.

The pin 16 and bore 58 are positioned for cam shaft 48 to be received within slot 56. Since cam shaft 48 is eccentrically mounted on cam 12, as cam 12 rotates about its axis X-X, the cam shaft 48 (riding within slot 56) causes locking pin 16 to move in a linear path parallel to the axial dimension of locking pin 16.

Figure 3:
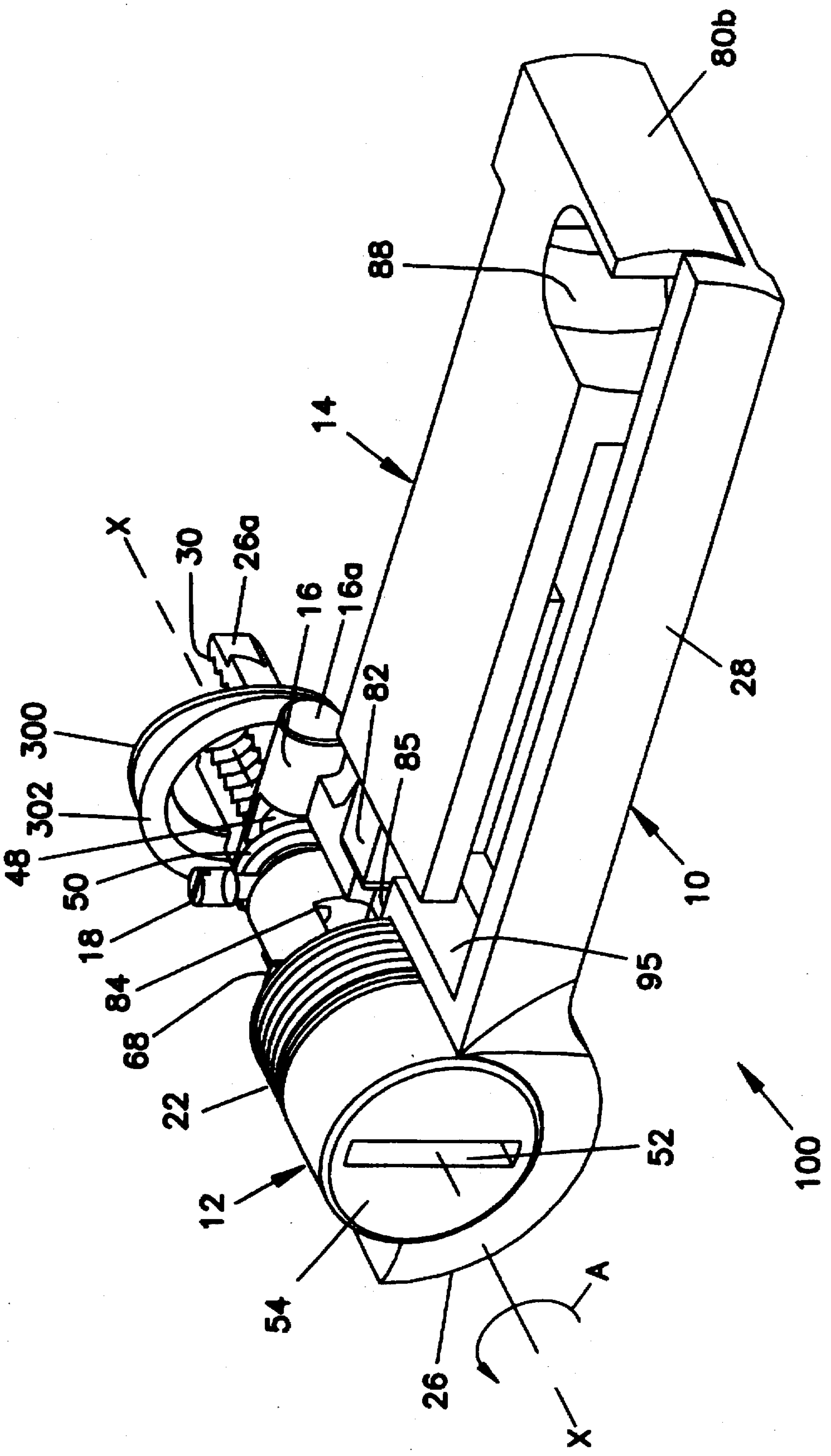
FIG. 3 is a partial sectional view of the locking handle of FIG. 1.
Figure 4:
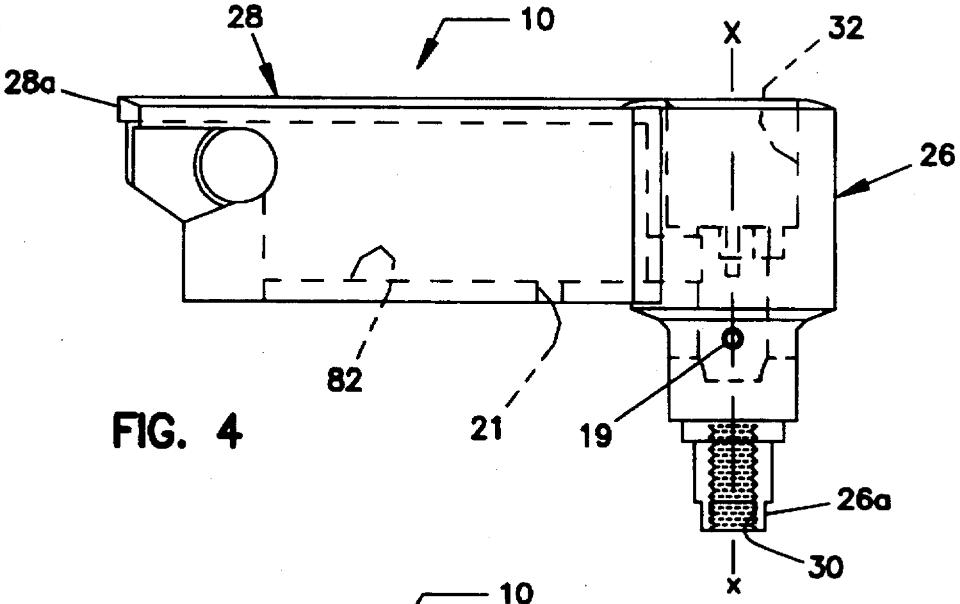
FIG. 4 is a side elevation view of a housing for the locking handle of FIG. 1.
Figure 5:
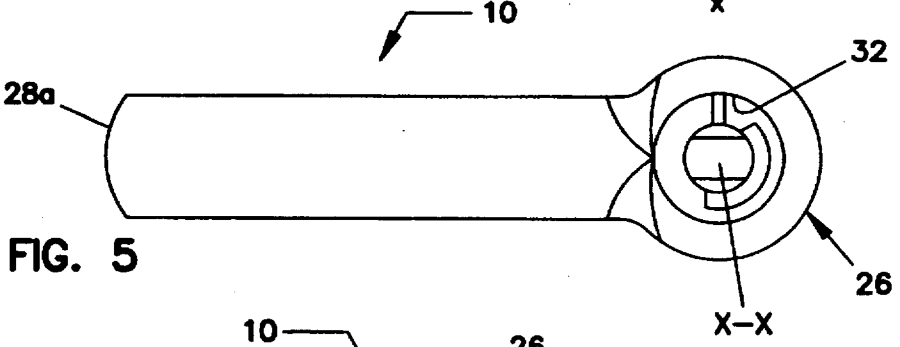
FIG. 5 is a front elevation view of the housing of FIG. 4.
Figure 6:
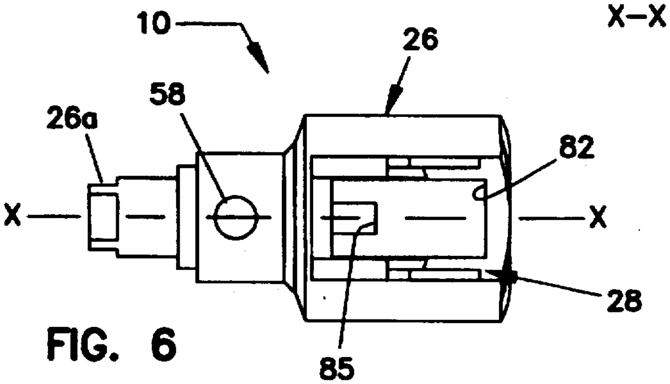
FIG. 6 is a end view of the housing of FIG. 4 viewed through an open end of a handle portion of the housing.
Figure 7:
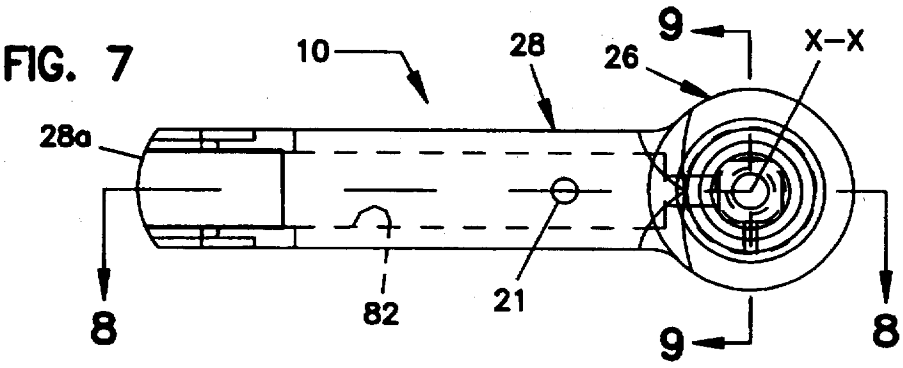
FIG. 7 is a view of the housing of FIG. 4 opposite the view of FIG. 5.

The locking pin 16 includes a locking end 16*a*. End 16*a* protrudes beyond the barrel 26 when the pin 16*a* is in a locked position as shown in FIG. 3. Rotation of the cam 12 in a counter-clockwise direction (arrow A in FIG. 3) causes the pin 16 moves to the left in the view of FIG. 3. This results in end 16*a* retracting into housing 10.

When the locking handle 100 is mounted to a door, the door may be provided with a recess for receiving pin 16 when pin 16 is in the locked position. Accordingly, when pin 16 is in the locked position, the door handle is restricted from rotation about axis X-X due to interference of the pin 16 with the material of the door. Upon retraction of pin 16 by means of rotating cam 12, the pin 16 is recessed into the barrel 26 permitting the handle 100 to be rotated about axis X-X relative to the door. Accordingly, when pin 16 is retracted, the handle may be rotated to operate a latch and thereby permit opening of the door. Pin 16 is rotated to the unlocked position by means of an operator placing any suitable tool (screwdriver, coin, or the like) within slot 52 and rotating the cam 12 in a counter-clockwise direction A about axis X-X.

The cam 12 is biased to rotate in a clockwise direction (with reference to FIG. 3) by means of a torsion spring 22. The torsion spring 22 has a first end 60 received within a pocket 62 (FIG. 12) formed in the large cylindrical end 40 of cam 12. A second end of torsion spring 22 is received within a pocket 66 (FIG. 8) formed within the barrel portion 26 of housing 10.

Spring 22 urges the cam 12 to rotate in a clockwise direction thereby urging pin 16 to its locked position. An operator inserting a suitable tool within slot 52 overcomes the bias of torsion spring 22 and urges the cam 12 to rotate in the counter-clockwise direction A causing pin 16 to retract.

The cam 12 is provided with a stop 68 which acts against a surface 70 (FIG. 8) on housing portion 26 to restrict the rotation of the cam 12 to a 90 degree maximum rotation. The slot 56 formed in pin 16 and the cam shaft 48 are mutually sized and positioned such that a 90 degree rotation of the cam 12 causes full rotation and full retraction of the pin 16 from the locked position into the unlocked position.

Locking bar 14 (shown separately in FIGS. 19 through 22) is provided to lock the cam 12 in its biased position with pin 16 in the locked position. Bar 14 is sized to be received within a pocket 82 (FIG. 8) formed in handle portion 28. A radially outer end 28*a* of handle portion 28 is open such that bar 14 may slide within pocket 82 toward and away from cam 12 (i.e., in a direction generally radial to axis X-X).

An internal end 80*a* of bar 14 is provided with a protruding pin 82. The distal end 44 of the cam 12 is provided with a bore 84 extending therethrough and sized to received pin 82. The bore 84 is positioned to receive pin 82 when the cam 12 and pin 16 are in the locked position. Further, a bore 85 (FIG. 8) in handle 10 connects pocket 82 with reduced diameter chamber 32*b*. Bore 85 is aligned with bore 84 when cam 12 is in the lock position.

When the cam 12 and pin 16 are in the locked position, lock bar 14 may be moved toward cam 12 with pin 82 received within bore 84. So received, pin 82 prevents further rotation of cam 12 about its axis X-X. Hence, with pin 82 received within bore 84, the locking bar 14 prevents the lock pin 16 from moving out of the locked position since the pin 82 prevents an operator from engaging a tool within slot 52 and rotating the cam 12.

An outer end 80*b* of lock bar 14 is provided with a slot 88 extending through the lock bar 14. Further, the housing 10 is provided with aligned holes 90 on opposite sides of the handle portion 28 with the holes 90 aligned with the slot 88 when the lock bar 14 is positioned with pin 82 received within bore 84. As a result, any suitable locking device (such as a padlock or the like) may be passed through holes 90 and slot 88 to lock the locking bar 14 in a locked position thereby preventing cam 12 from rotating and retaining locking pin 16 in a locked position.

The locking bar 14 is provided with compression spring 24 to urge pin 82 out of bore 84. The compression spring 24 is received within a recess 94 (FIG. 22) formed within locking bar 14. One end of the spring 24 acts against the material of the locking bar 14 and an opposite end of the spring 24 acts against the material of a dividing wall 95 (FIG. 8) between pocket 82 and chamber 32. The spring 24 is aligned to urge locking bar 14 radially away from cam 12.

Threaded set screw 18 is provided to pass through a threaded bore 19 formed in the housing 10. The screw 18 is received within the groove 50 of cam 12. Accordingly, the set screw 18 prohibits the cam 12 from moving axially within the barrel portion 26 of the housing 10.

Retaining pin 20 is press fit into a hole 21 (FIG. 7) in handle portion 28 and received within a longitudinally extending groove 23 (FIG. 22) formed in lock bar 14. The pin 20 opposes a surface 25 in groove 23 to prevent lock bar 14 from moving out of open end 28*a* of handle portion 28 beyond the position shown in FIG. 3.

With the description thus provided, it will be noted that locking handle 100 of the present invention may be affixed to a door and with attachment means 30 secured to a latch mechanism of a door. Rotation of the handle 100 about axis X-X will urge the latch mechanism to move to thereby permit opening of the door.

The pin 16 is normally biased to a locked position such that the handle 100 may not be rotated about axis X-X unless an operator inserts a tool within slot 52 and urges the cam 12 to rotate in a counter-clockwise direction to thereby retract pin 16.

With the pin in the locking position, the locking bar 14 may be moved against the bias of the compression spring 24 to insert pin end 82 within bore 84 and thereby prevent rotation of the cam 12. The locking bar 14 may be secured in this position by means of a padlock or other suitable locking device extending through the aligned holes 90 and slot 88. So locked, the locking handle 100 prohibits unauthorized access to a cabinet or the like.

The foregoing description illustrates a locking handle which is easy to use, easy to manufacture and is sturdy and durable. Having thus shown how the objects of the invention have been achieved in the preferred manner, it will be appreciated that modifications and equivalents of the disclosed concepts may readily occur to one skilled in the art. Accordingly, it is intended that such modifications and equivalents be included in the scope of the claims which are appended hereto.

What is claimed is:

1. A locking handle for an access door, said handle comprising:

a housing having an axial dimension;

a locking pin mounted within said housing and movable generally transverse to said axial dimension between a pin locked position and a pin unlocked position, said pin in said pin locked position having a locking end protruding beyond an exterior of said housing, said pin in said pin unlocked position having said locking end retracted toward said housing;

an operator engageable cam secured to said housing and movable between a first position and a second position, said cam operably connected to said locking pin for said cam to urge said locking pin to move between said pin locked position and said pin unlocked position as said cam is moved between said first position and said second position, said cam additionally including a recess;

a lock bar secured to said housing and movable between a bar locked position and a bar unlocked position, said lock bar releasably engageable with said cam, said lock bar including means for engaging said recess of said cam when said cam is in said first position for said lock bar to restrict movement of said cam from said first position when said bar is in said bar locked position;

first biasing means for biasing said cam to said first position; and second biasing means for biasing said lock bar to said bar unlocked position.

2. A locking handle according to claim 1, comprising cooperating openings formed in said housing and said bar with said openings in alignment when said bar is in said bar locked position.

3. A locking handle according to claim 1, wherein said cam is mounted within said housing for rotation about an axis of rotation, a cam shaft secured to an axial end of said cam and extending therefrom in a direction generally parallel and spaced from said axis of rotation, a slot formed within said locking pin and sized to received said cam shaft for said cam to urge said pin to move in a linear path of travel in response to a rotational movement of said cam about said axis of rotation.

4. A locking handle according to claim 1, wherein said engaging means on said lock bar includes a stop pin extending from an end thereof, said recess in said cam is sized and positioned to receive said stop pin when said cam is in said first position and said bar is in said bar locked position.

5. A locking handle for an access door, said handle comprising:

a housing having an axial dimension and an opening;

a locking pin mounted within said housing and movable generally transverse to said axial dimension between a pin locked position and a pin unlocked position, said pin in said pin locked position having a locking end protruding beyond an exterior of said housing, said pin in said pin unlocked position having said locking end retracted toward said housing;

an operator engageable cam secured to said housing and movable between a first position and a second position, said cam operably connected to said locking pin for said cam to urge said locking pin to move between said pin locked position and said pin unlocked position as said cam is moved between said first position and said second position, said cam additionally including a recess; and a lock bar secured to said housing and movable between a bar locked position and a bar unlocked position, said lock bar releasably engageable with said cam, said lock bar including means for engaging said recess of said cam when said cam is in said first position for said lock bar to restrict movement of said cam from said first position when said bar is in said bar locked position;

said lock bar including an opening for cooperating with said opening in said housing when said housing opening and said lock bar opening are in alignment when said lock bar is in said bar locked position.

6. A locking handle according to claim 5, comprising first biasing means for biasing said cam to said first position.

7. A locking handle according to claim 5, wherein said cam is mounted within said housing for rotation about an axis of rotation, a cam shaft secured to an axial end of said cam and extending therefrom in a direction generally parallel and spaced from said axis of rotation, a slot formed within said locking pin and sized to received said cam shaft for said cam to urge said pin to move in a linear path of travel in response to a rotational movement of said cam about said axis of rotation.

8. A locking handle according to claim 5, wherein said engaging means on said lock bar includes a stop pin extending from an end thereof, said recess in said cam is sized and positioned to receive said stop pin when said cam is in said first position and said bar is in said bar locked position.

9. A locking handle for an access door, said handle comprising:

a housing having an axial dimension;

a locking pin mounted within said housing and movable generally transverse to said axial dimension between a pin locked position and a pin unlocked position, said pin in said pin locked position having a locking end protruding beyond an exterior of said housing, said pin in said pin unlocked position having said locking end retracted toward said housing;

an operator engageable cam secured to said housing and movable between a first position and a second position, said cam operably connected to said locking pin for said cam to urge said locking pin to move between said pin locked position and said pin unlocked position as said cam is moved between said first position and said second position, said cam additionally including a recess, said cam mounted within said housing for rotation about an axis of rotation;

a cam shaft secured to an axial end of said cam and extending from therefrom in a direction generally parallel and spaced from said axis of rotation;

a slot formed within said locking pin and sized to receive said cam shaft for said cam to urge said pin to move in a linear path of travel in response to a rotational movement of said cam about said axis of rotation; and a lock bar secured to said housing and movable between a bar locked position and a bar unlocked position, said lock bar releasably engageable with said cam, said lock bar including means for engaging said recess of said cam when said cam is in said first position for said lock bar to restrict movement of said cam from said first position when said bar is in said bar locked position.

10. A locking handle according to claim 9, comprising first biasing means for biasing said cam to said first position.

11. A locking handle according to claim 9, wherein said engaging means on said lock bar includes a stop pin extending from an end thereof, said recess in said cam is sized and positioned to receive said stop pin when said cam is in said first position and said bar is in said bar locked position.

* * * * *